United States Patent
Hirokane et al.

(10) Patent No.: US 7,179,869 B2
(45) Date of Patent: Feb. 20, 2007

(54) PROCESS FOR PRODUCING POLYESTER RESINS

(75) Inventors: Takeshi Hirokane, Kanagawa (JP); Tomohito Oyama, Kanagawa (JP); Shojiro Kuwahara, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 11/076,964

(22) Filed: Mar. 11, 2005

(65) Prior Publication Data

US 2005/0209435 A1    Sep. 22, 2005

(30) Foreign Application Priority Data

Mar. 22, 2004 (JP) ............................ 2004-081873
Jan. 18, 2005 (JP) ............................ 2005-010316

(51) Int. Cl.
*C08F 20/00* (2006.01)
*C08G 59/00* (2006.01)
*C08G 63/66* (2006.01)

(52) U.S. Cl. ...................... 525/444; 528/279; 528/283; 528/286; 528/300; 528/302; 528/308; 528/308.6; 528/406; 524/706; 524/710; 524/755; 524/765; 524/791; 521/48.5

(58) Field of Classification Search .............. 528/279, 528/300, 302, 308, 308.6, 406, 283, 286; 525/437, 444; 524/755, 765, 783, 791, 706, 524/710; 521/48.5

See application file for complete search history.

(56) References Cited

FOREIGN PATENT DOCUMENTS

| EP | 1164155 | * | 12/2001 |
| EP | 11411074 | * | 4/2004 |
| WO | WO95/21881 | * | 8/1995 |

* cited by examiner

*Primary Examiner*—Samuel A. Acquah
(74) *Attorney, Agent, or Firm*—Antonelli, Terry, Stout and Kraus, LLP.

(57) ABSTRACT

In the invention, a polyester resin having dicarboxylic acid constitutional units and diol constitutional units wherein 5 to 60 mol % of the diol constitutional units has a cyclic acetal skeleton is produced by a process including an oligomerization step and a polymerization step. In the oligomerization step, an ester having a limited acid value is transesterified with a diol having a cyclic acetal skeleton in the presence of a titanium compound to obtain an oligomer. The oligomer is then polymerized in the subsequent polymerization step to increase the molecular weight.

20 Claims, No Drawings

PROCESS FOR PRODUCING POLYESTER RESINS

BACKGROUND OF THE INVENTION

1. Field of the Invention

The present invention relates to a process for producing polyester resins including dicarboxylic acid constitutional units and diol constitutional units having a cyclic acetal skeleton, which are excellent in mechanical properties, particularly in impact resistance and have a low yellowness.

2. Description of the Prior Art

Polyethylene terephthalate (hereinafter referred to as "PET") has been extensively used in various applications such as films, sheets and hollow containers because of its excellent transparency, mechanical properties, melt stability, solvent resistance, fragrance retention and recyclability. However, being not necessarily good in heat resistance, the modification of PET has been widely made by copolymerization.

It has been known that the heat resistance, adhesion property, flame retardancy, etc. of polymers can be improved by the modification with a compound having a cyclic acetal skeleton. Such improvements are attributable to the rigid skeleton of cyclic acetal and the acetal bond. Therefore, there have been proposed various modifications of polyester resins by copolymerizing a compound having a cyclic acetal skeleton.

For example, U.S. Pat. No. 2,945,008 teaches that PET modified with 3,9-bis (1,1-dimethyl-2-hydroxyethyl)-2,4,8,10-tetraoxaspiro[5.5]undecane exhibits a high glass transition point and is excellent in heat resistance. Japanese Patent 2971942 discloses a container excellent in transparency and heat resistance which is made of a copolyester produced from terephthalic acid, 1,4-butane diol and a glycol having a cyclic acetal skeleton and a production method thereof. Japanese Patent 1979830 discloses a polyester excellent in heat resistance and transparency which is produced using a diol having a cyclic acetal skeleton.

Regarding the adhesion property attributable to the acetal bond, Japanese Patents 1843892, 1855226 and 1902128 and JP 4-88078 A disclose adhesives, adhesive compositions and coating agents which contain polyesters produced using a diol or dicarboxylic acid having a cyclic acetal skeleton.

As other polyesters produced using a dicarboxylic acid or diol having a cyclic acetal skeleton, there have been proposed a polyester combined yarn with different shrinkage (JP 3-130425 A), a modified polyester film (JP 8-104742 A), a biodegradable polyester (JP 9-40762 A), an electrostatic developing toner (Japanese Patent 1652382), and a flame retardant resin composition (JP 2000-344939 A).

Polyester resins are generally produced by a direct esterification method or a transesterification method. In the direct esterification method, a dicarboxylic acid is esterified into a bishydroxyalkyl dicarboxylate by an excess of diol, which ester is then polycondensed into polyester under reduced pressure. In the transesterification method, an ester produced from a dicarboxylic acid and a monohydric alcohol is transesterified into a bishydroxyalkyl dicarboxylate by an excess of diol, which ester is then polycondensed into polyester under reduced pressure. In the production of PET, the direct esterification method is industrially advantageous over the transesterification method because terephthalic acid is less expensive than dimethyl terephthalate. Since the esterification of a dicarboxylic acid with a diol needs no catalyst, a high-quality polyester resin containing a less amount of impurities such as catalyst residues is produced in the direct esterification method, this making the direct esterification method further advantageous over the transesterification method. In the production of ester of a dicarboxylic acid with a diol, alcohol is by-produced in the transesterification method, whereas water is by-produced in the direct esterification method. Therefore, the direct esterification method puts a less load on the environment as compared with the transesterification method. For these reasons, at present, the direct esterification method has been predominantly used in the industrial production of PET.

However, it has been found that the production of a polyester resin containing diol constitutional units having a cyclic acetal skeleton (hereinafter referred to as "cyclic acetal diol-modified polyester resin") by a common direct esterification method involves some drawbacks. In such a production, the cyclic acetal skeleton is decomposed to form three- and four-functional substances by the action of carboxyl groups present in the reaction system and generated water, thereby broadening the molecular weight distribution of resultant polyester resins or provide gelated products. Thus, the cyclic acetal diol-modified polyester resins produced by the direct esterification method are considerably poor in moldability, mechanical properties, etc. as compared with compositionally analogous polyester resins produced by the transesterification method.

Among the above patent documents related to cyclic acetal diol-modified polyester resins, only JP 3-130425 A describes the direct esterification method. However, actual production conditions and the ring opening of the cyclic acetal skeleton by the action of dicarboxylic acid are not disclosed therein.

Under recently increasing attraction to recycling of PET, especially chemical recycling thereof, many chemical recycling methods have been proposed (JP 2002-60543 A, JP 2002-60369A and JP 2002-167469 A). The method for producing polyester resins using bis(β-hydroxyethyl) terephthalate (hereinafter occasionally referred to merely as "BHET") recovered from PET by chemical recycling method puts a light load on the environment and is industrially advantageous. Since substantially free from acid ends derived from the dicarboxylic acid, BHET is suitable as the raw material for the cyclic acetal diol-modified polyesters. However, none of the above patent documents discloses the method of producing the cyclic acetal diol-modified polyesters from a bishydroxyalkyl dicarboxylate, which is recovered by depolymerizing polyester resins, as the raw material.

The inventors found a process of producing cyclic acetal diol-modified polyester resins, which comprised a step of esterifying a dicarboxylic acid into a bishydroxyalkyl dicarboxylate or its polymer with a diol having no cyclic acetal skeleton, a step for transesterifying the ester groups with a diol having a cyclic acetal skeleton, and a step for polycondensing the resultant ester. The inventors further found that, in the above process, it was important to control the carboxyl group concentration and the water content in the reaction system during the transesterification of the bishydroxyalkyl dicarboxylate or its polymer with the diol having a cyclic acetal skeleton, and found that, by such a control, the decomposition of the cyclic acetal skeleton and the change of the cyclic acetal diol into three- and four-functional substances were prevented and the polyester resins were stably produced without causing gelation and without broadening the molecular weight distribution. On the basis of these findings, the inventors filed a Japanese patent application which was published as JP 2004-137477A. This application was directed also to a process of producing cyclic acetal diol-modified polyester resins wherein BHET putting a light load on the environment was used as the raw material. However, the clogging of pipes of production apparatus due to sublimable diol having a cyclic acetal skeleton as well as the mechanical properties and yellowness of the cyclic acetal diol-modified polyester resins produced by the proposed method are not considered therein.

SUMMARY OF THE INVENTION

In view of the above circumstances, the present invention is directed to an industrially advantageous process for stably producing polyester resins (cyclic acetal diol-modified polyester resins) which include dicarboxylic acid constitutional units and diol constitutional units wherein 5 to 60 mol % of the diol constitutional units have a cyclic acetal skeleton. The invention is further directed to an industrially advantageous process for stably producing such polyester resins that are excellent in mechanical properties, particularly in impact resistance, and have a low yellowness.

As a result of extensive research on the production of polyester resins including dicarboxylic acid constitutional units and diol constitutional units wherein 5 to 60 mol % of the diol constitutional units have a cyclic acetal skeleton, the inventors have reached a production method including an oligomerization step for transesterifying a bishydroxyalkyl dicarboxylate and/or its polymer having a limited acid value with a diol having a cyclic acetal skeleton (diol A) in the presence of a titanium compound E to produce an oligomer, and a polymerization step for polymerizing the oligomer to increase the molecular weight. With such a production method, the decomposition of the cyclic acetal skeleton during the production can be prevented to allow the stable production of the target polyester resins without significantly broadening the molecular weight distribution of polyester resins, causing the gelation of polyester resins and causing the clogging of pipes due to the sublimation of diol A. The inventors have further found that the mechanical properties, particularly the impact resistance is significantly improved and the yellowness is significantly lowered by performing the oligomerization step, in addition to the titanium compound E, in the presence of an amount of a phosphorus compound F or a combination of the phosphorus compound F and a germanium compound G. The present invention is based on these findings.

Thus, the present invention provides a process for producing a polyester resin having dicarboxylic acid constitutional units and diol constitutional units wherein 5 to 60 mol % of the diol constitutional units have a cyclic acetal skeleton, said process including an oligomerization step for transesterifying an ester D having an acid value of 30 μeq/g or lower and represented by the following formula 1:

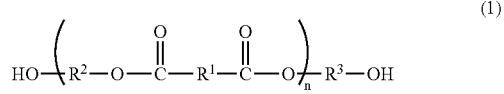

wherein $R^1$, $R^2$ and $R^3$ are each independently a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and n is an integer of 1 to 200,
with a diol A having a cyclic acetal skeleton in the presence of a titanium compound E to produce an oligomer; and a polymerization step of polymerizing the oligomer to increase a molecular weight.

DETAILED DESCRIPTION OF THE INVENTION

The production method of the present invention is described in detail below.

The production method of the present invention includes an oligomerization step of transesterifying an ester D having an acid value of 30 μeq/g or lower and represented by the formula 1:

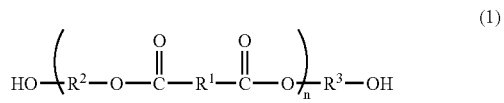

with a diol A having a cyclic acetal skeleton in the presence of a titanium compound E to produce an oligomer; and a polymerization step of polymerizing the oligomer to increase the molecular weight. In the formula 1, $R^1$, $R^2$ and $R^3$ are each independently a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and n is an integer of 1 to 200. When n is 2 or more, plural $R^1$ groups and plural $R^2$ groups may be respectively the same or different. The production process of the present invention may be carried out in known apparatuses which have been conventionally used for the production of polyester resins, without any modification.

The acid value of ester D is 30 μeq/g or lower, preferably 1 to 30 μeq/g. If exceeding 30 μeq/g, the diol A having a cyclic acetal skeleton is undesirably decomposed into three- and four-functional substances in the oligomerization step by the action of acid. The ester D may be either a monomer or a polymer as long as it has an acid value of 30 μeq/g or lower. The average polymerization degree of the ester D is preferably 1 or more but less than 200. The average polymerization degree referred to herein is determined by dividing the number-average molecular weight of ester D as measured by gel permeation chromatography by the molecular weight of its repeating units.

The ester D is a bishydroxyalkyl ester of a dicarboxylic acid and/or its polymer, preferably a bishydroxyalkyl ester of an aromatic dicarboxylic acid and/or its polymer, and more preferably a bishydroxyalkyl ester of at least one dicarboxylic acid selected from the group consisting of terephthalic acid, isophthalic acid and 2,6-naphthalenedicarboxylic acid, and/or its polymer.

The ester D may be produced, for example, by the following methods 1 to 3, although not limited thereto.

In the method 1 for the production of ester D, a dicarboxylic acid B and a diol C having no cyclic acetal skeleton are subjected to esterification, and then the obtained ester is polycondensed into an ester D1 having an average polymerization degree of 15 to 200.

Examples of the dicarboxylic acid B usable in the method 1 include, but not limited to, aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid and pentacyclododecanedicarboxylic acid; and aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetralindicarboxylic acid, with the aromatic dicarboxylic acids being preferred in view of good mechanical properties and heat resistance of resultant polyester resins. More preferred are terephthalic acid, 2,6-naphthalenedicarboxylic acid and isophthalic acid, and still more preferred is terephthalic acid in view of economy. These dicarboxylic acids may be used singly or in combination of two or more. In addition, a monocarboxylic acid such as benzoic acid, propionic acid and butyric acid may be used in an amount not adversely affecting the effects of the invention.

Examples of the diol C usable in the method 1 include, but not limited to, aliphatic diols such as ethylene glycol, trimethylene glycol, 1,4-butanediol, 1,5-pentanediol, 1,6-hexanediol, diethylene glycol, propylene glycol and neopentyl glycol; polyether diols such as polyethylene glycol, polypropylene glycol and polybutylene glycol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphithalene dimethanol, 2,7-decahydronaphthalene dimethanol, tetralin dimethanol, norbornane dimethanol, tricyclodecane dimethanol and pentacyclododecane dimethanol; bisphenols such as 4,4'-(1-methylethylidene)bisphenol, methylene bisphenol (bisphenol F), 4,4'-cyclohexylidene bisphenol (bisphenol Z) and 4,4'-sulfonyl bisphenol (bisphenol S); alkyleneoxide adducts of the above bisphenols; aromatic dihydroxy compounds such as hydroquinone, resorcin, 4,4'-dihydroxybiphenyl, 4,4'-dihydroxydiphenyl ether and 4,4'-dihydroxydiphenyl benzophenone; and alkyleneoxide adducts of the above aromatic dihydroxy compounds, with ethylene glycol being particularly preferred in view of good mechanical properties of resultant polyester resins and economy. These diols may be used singly or in combination of two or more.

In addition to the dicarboxylic acid B and the diol C, there may be used monohydric alcohols such as butyl alcohol, hexyl alcohol and octyl alcohol and tri or more valent alcohols such as trimethylol propane, glycerol and pentaerythritol, unless the effects of the present invention is adversely affected.

The method 1 may be performed in the same manner as in the esterification and polycondensation employed in the conventional production of polyester resins by a direct esterification method. The dicarboxylic acid B and the diol C are charged so that the number of molecules of diol C is preferably 1.01 to 10 times, more preferably 1.1 to 5 times and still more preferably 1.15 to 2 times the number of molecules of dicarboxylic acid B. Within such a charge ratio, undesired side reactions such as etherification of the diol C by dehydration are effectively prevented.

The esterification may be conducted under the same temperature and pressure conditions as in the esterification employed in the conventional production of polyester resins by a direct esterification method. Specifically, the esterification temperature is preferably 80 to 270° C., more preferably 100 to 260° C. and still more preferably 150 to 250° C., although not particularly limited thereto. The esterification pressure is preferably 10 to 500 kPa, although not particularly limited thereto. The esterification reaction is carried out while removing the water being generated out of the reaction system until the conversion to ester reaches preferably 90% or higher, more preferably 92% or higher and still more preferably 95% or higher when calculated from the amount of water removed. Although it is preferred to conduct the esterification in the absence of catalyst in view of good transparency and low yellowness of resultant polyester resins, the catalyst may be used in an amount of 0.0001 to 5% of the number of molecules of dicarboxylic acid B in terms of the number of metal atoms contained in the catalyst. Any known catalyst can be used without any specific limitation, and examples thereof include metal compounds and metallic magnesium. The metal compounds are, for example, fatty acid salts, carbonates, phosphates, hydroxides, chlorides, oxides and alkoxides of metals such as zinc, lead, cerium, cadmium, manganese, cobalt, lithium, sodium, potassium, calcium, nickel, magnesium, vanadium, aluminum, titanium, germanium, antimony and tin. These catalysts may be used singly or in combination of two or more. Also, the esterification may be performed in the presence of a known etherification inhibitor such as amine compounds and/or a known heat stabilizer such as phosphoric acid, phosphorous acid, phosphoric esters and phosphorous esters.

If the esterification fails to provide the ester D1 having an acid value of 30 µeq/g or less, the polycondensation should be further conducted. The polycondensation may be conducted under the same temperature and pressure conditions as in the polycondensation employed in the conventional production of polyester resins. The temperature is gradually raised until finally reaching preferably 200 to 300° C., and the pressure is gradually lowered until finally reaching preferably 300 Pa or lower. The polycondensation is conducted either in the absence of catalyst or in the presence of catalyst in an amount of 0.0001 to 5% of the number of dicarboxylic acid B units in terms of the number of metal atoms in the catalyst. Any known catalysts as describe above can be used singly or in combination of two or more, without any specific limitation. Preferred are compounds of metals such as aluminum, titanium, germanium, antimony and tin, and more preferred are alkoxides, oxides and carboxylates of titanium, alkoxides and oxides of germanium, and oxides of antimony. The polycondensation may be performed in the presence of the known heat stabilizer mentioned above.

The polycondensation is continued until the acid value of the ester D1 reaches 30 µeq/g or lower. If the acid value is reduced to 30 µeq/g or lower before reaching the final temperature and final pressure described above, the reaction may be stopped immediately. If the acid value is 30 µeq/g or lower when the esterification is completed, it is no longer required to carry out the polycondensation.

In the method 2 for the production of ester D, the ester D2 is produced by depolymerizing a low polymer which is prepared by esterifying the dicarboxylic acid B with the diol C and/or a high polymer which is prepared by polycondensing the low polymer (hereinafter collectively referred to as ester D2') with the diol C until the average polymerization degree becomes less than 15 and the melting point becomes 240° C. or lower. The ester D2' is a precursor of the ester D2. As described above, the ester D2' may be either a low polymer prepared by the esterification employed in known production method of polyester resins or a high polymer prepared by further polycondensing a low polymer obtained by the esterification. Preferably, the ester D2' is prepared only by the esterification in view of reducing the heat history, simplifying the process and saving the energy consumption. The low polymer referred to herein is a polymer which is produced only by the esterification employed in known production method of polyester resins and its average polymerization degree is preferably 2 or more but less than 25, although not particularly limited thereto. The high polymer referred to herein is a polymer which is produced through the polycondensation and its average polymerization degree is preferably 10 or more but less than 200, although not limited thereto. The average polymerization degree of the ester D2' is preferably 2 or more but less than 200, more preferably 2 or more but less than 70, still more preferably 2 or more but less than 25. The acid value of the ester D2' may be 30 µeq/g or larger.

The dicarboxylic acid B and the diol C as described above with respect to the method 1 may be used in the method 2 without any specific limitation.

The depolymerization is preformed by adding the diol C to the ester D2' so that the number of molecules of diol C is preferably 1.1 to 10 times, more preferably 1.3 to 5 times, and still more preferably 1.5 to 3 times the number of dicarboxylic acid units in the ester D2'. The depolymerization temperature is preferably 150 to 250° C., more preferably 180 to 230° C., and the depolymerization pressure is preferably 50 to 500 kPa, more preferably 100 to 300 kPa. If the pressure is equal to the vapor pressure of diol C or lower, the depolymerization is preferably conducted under reflux without removing the diol C out of the reaction system. By carrying out the depolymerization under the above conditions, undesired side reactions such as etherification of the diol C by dehydration are effectively prevented.

Although the depolymerization is conducted preferably in the absence of catalyst in view of good transparency and low yellowness of the resultant polyester resins, a catalyst may be used in an amount of 0.0001 to 5% of the number of dicarboxylic acid units in the ester D2' in terms of the number of metal atoms in the catalyst. The known catalysts as describe above with respect to the method 1 may be used, although not limited thereto. Of the catalysts described above, preferred are carboxylates and oxides of metals such as zinc, lead, cerium, cadmium, manganese, cobalt, lithium, sodium, potassium, calcium, nickel, magnesium, vanadium, aluminum, titanium, germanium, antimony and tin, with acetates of zinc, lead, cerium, cadmium, manganese and cobalt, antimony trioxide, germanium oxide being more preferred. These catalysts may be used alone or in combination of two or more.

The end carboxyl groups remaining slightly in the ester D2' is esterified simultaneously with the depolymerization of the ester D2'. Therefore, the acid value of the ester D2 obtained by the depolymerization is usually smaller than that of the ester D2' before the depolymerization. The acid value of the ester D2' can be effectively reduced by distilling off the water being released by the esterification during the depolymerization. Thus, the method 2 is preferred because the ester D2 having an acid value of 30 µeq/g or lower, preferably 20 µeq/g or lower, more preferably 10 µeq/g or lower is relatively easily obtained. In addition, the melting point of the ester D2' obtained by the depolymerization is generally lower than that of the ester D2' before depolymerization. Thus, the method 2 is also preferred because the ester D2having a melting point of preferably 240° C. or lower, more preferably 220° C. or lower, and still more preferably 210° C. or lower is relatively easily obtained. When the melting point of the ester D2 is within the above range, the reaction temperature in the subsequent oligomerization step can be preferably reduced to 240° C. or lower to effectively prevent the diol A from being thermally decomposed in the oligomerization step. For these reasons, the ester D2 is, in some cases, more suitable than the ester D1 as the ester D for use in the production method of the invention.

If the ratio of the number of diol constitutional units to the number of dicarboxylic acid constitutional units in the depolymerized product is larger than 3.0, the diol C should be mainly distilled off at 150 to 250° C. under a pressure of 0.5 to 100 kPa so as to reach a ratio of 3.0 or smaller at the completion of the depolymerization. If larger than 3.0, the diol C is easily etherified by dehydration, and the water released may decompose the cyclic acetal skeleton of diol A to form three- and four-functional substances in the subsequent oligomerization step. In addition, the by-produced ether may deteriorate the properties of final polyester resins. Even when the ratio is 3.0 or lower, the diol C may be mainly distilled off under the above conditions to further reduce the ratio.

The ratio of the number of diol constitutional units to the number of dicarboxylic acid constitutional units of the ester D2 thus produced is preferably 1.1 to 3.0, more preferably 1.1 to 2.0, still more preferably 1.1 to 1.7, and particularly preferably 1.1 to 1.5. By regulating the ratio within the above range, undesired side reactions such as etherification by dehydration are effectively prevented in the subsequent oligomerization step.

In the method 3 for the production of ester D, a conventionally known polyester resin D3' in place of the ester D2' is depolymerized with the diol C in the same manner as in the method 2 until the average polymerization degree becomes less than 15 and the melting point becomes 240° C. or less.

Examples of the polyester resin D3' include, but not limited to, polyethylene terephthalate, polybutylene terephthalate, polyethylene naphthalate, isophthalic acid-modified polyethylene terephthalate, polyethylene terephthalate modified by 1,4-cyclohexane dimethanol, polyethylene terephthalate modified by 3,9-bis(1,1-dimethyl-2-hydroxyethyl)-2,4,8,10-tetraoxaspiro[5.5]undecane and polyethylene terephthalate modified by 5-methylol-5-ethyl-2-(1,1-dimethyl-2-hydroxyethyl)-1,3-dioxane.

The acid value of the ester D3 may become smaller than that of the polyester resin D3' for the same reasons as described above, and can be regulated relatively easily within 30 µeq/g or lower, preferably within 20 µeq/g or lower and more preferably within 10 µeq/g or lower. Therefore, the decomposition of the cyclic acetal skeleton of diol A and the formation of three- and four-functional substances are preferably prevented in the subsequent oligomerization step. The melting point of the ester D3 can be regulated preferably within 240° C. or lower, more preferably within 220° C. or lower and still more preferably within 210° C. or lower for the same reasons as described above. This allows the temperature of the subsequent oligomerization step to be reduced to 240° C. or lower. Therefore, the thermal decomposition of the diol A in the oligomerization step is effectively prevented. The depolymerization may be performed in the presence of a catalyst selected from those as described with respect to the method 2 for the production of ester D.

The ratio of the number of diol constitutional units to the number of dicarboxylic acid constitutional units of the ester D3 is preferably 1.1 to 3.0, more preferably 1.1 to 2.0, still more preferably 1.1 to 1.7 and particularly preferably 1.1 to 1.5. By regulating the ratio within the above range, undesired side reactions such as etherification of diols by dehydration in the subsequent oligomerization step are effectively prevented.

In the methods 1 to 3, an orthoformic acid triester and/or a carbonic acid diester may be added, because the acid value of the ester D may be effectively reduced. Examples of the orthoformic acid triesters include trimethyl orthoformate and triethyl orthoformate. Examples of the carbonic acid diester include dimethyl carbonate and diethyl carbonate.

Bis(β-hydroxyethyl) terephthalate (ester D4) can be used as the ester D. The acid value of the ester D4 is 30 μeq/g or lower, preferably 20 μeq/g or lower and more preferably 10 μeq/g or lower. The method for preparing the ester D4 is not particularly limited, and the ester D4 is preferably prepared by a chemical-recycling of PET in view of reducing the load on the environments.

The ester D1 obtained by the method 1, the ester D2 obtained by the method 2, the ester D3 obtained by the method 3 and the ester D4 may be used as the ester D, singly or in combination of two or more in desired proportions.

In the oligomerization step of the process of the invention, the ester D is reacted with the diol A having a cyclic acetal skeleton in the presence of the titanium compound E to cause the transesterification mainly between the ester groups of ester D and the diol A, thereby producing an oligomer comprising the dicarboxylic acid constitutional units, the diol constitutional units having a cyclic acetal skeleton and the diol constitutional units having no cyclic acetal skeleton.

The diol A having a cyclic acetal skeleton is not limited particularly, and may be at least one compound selected from the group consisting of the diol compounds represented by the formula 2:

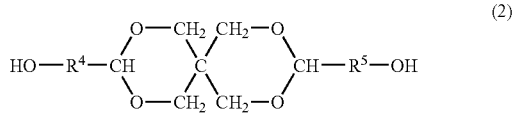

(2)

and the diol compounds represented by the following formula 3:

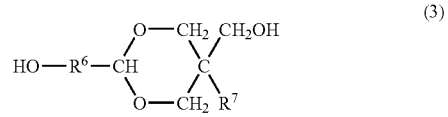

(3)

In the formula 2, $R^4$ and $R^5$ are each independently a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, preferably methylene, ethylene, propylene, butylene or structural isomers thereof such as isopropylene and isobutylene. In the formula 3, $R^6$ is a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, preferably methylene, ethylene, propylene, butylene or structural isomers thereof such as isopropylene and isobutylene, and $R^7$ is a monovalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, preferably methyl, ethyl, propyl, butyl or structural isomers thereof such as isopropyl and isobutyl.

Specific examples of the diol A include 3,9-bis(1,1-dimethyl-2-hydroxyethyl)-2,4,8,10-tetraoxaspiro[5.5]undecane and 5-methylol-5-ethyl-2-(1, 1-dimethyl-2-hydroxyethyl)-1,3-dioxane.

In the oligomerization step, the diol A is charged so as to regulate the ratio of the number of molecules of diol A to the number of dicarboxylic acid constitutional units in the ester D preferably within 0.05 to 0.60. Within the above range, polyester resins having the diol constitutional units wherein 5 to 60 mol % thereof has a cyclic acetal skeleton are produced. Such polyester resins are excellent in properties such as transparency, mechanical properties and heat resistance. In view of attaining excellent properties, the ratio is more preferably 0.10 to 0.55 and still more preferably 0.20 to 0.45.

Since the acid value of the ester D used in the oligomerization step is 30 μeq/g or lower, the decomposition of the cyclic acetal skeleton of diol A into three- and four-functional substances due to the free carboxyl groups is prevented in the production of oligomer from the ester D and the diol A. This ensures the stable production of polyester resins without causing gelation and significantly increasing the molecular weight distribution to allow resultant polyester resins to have excellent mechanical properties, moldability and fabricability. The acid value of the ester D is preferably 20 μeq/g or lower and more preferably 10 μeq/g or lower.

It is important for the process of the invention to conduct the oligomerization step in the presence of the titanium compound E. Since the titanium compound E serves as the transesterification catalyst in the oligomerization step, the use thereof allows the transesterification between the ester D and the diol A to proceed promptly.

Examples of the titanium compounds include, but not limited to, orthotitanic acid esters such as tetra-n-butyl titanate, tetra-n-butyl titanate dimer, tetra-n-butyl titanate trimer, tetra-n-butyl titanate tetramer, tetra-t-butyl titanate, tetra-n-propyl titanate, tetra-isopropyl titanate, tetraphenyl titanate, tetracyclohexyl titanate and tetrabenzyl titanate; titanium carboxylates such as titanium acetate and titanium oxalate; alkali metal titanates such as potassium titanate and sodium titanate; titanium halides such as titanium chloride, titanium bromide and titanium fluoride; titanium oxides; titanic acid-aluminum hydroxide mixtures; titanium chloride-aluminum chloride mixtures; salts of titanium fluoride such as titanium potassium fluoride, titanium manganese fluoride, and titanium ammonium fluoride; titanium acetylacetonato; titanium potassium oxalate; and titanium sodium oxalate, with orthotitanic acid esters being preferred and tetra-n-propyl titanate, tetra-isopropyl titanate and tetra-n-butyl titanate being particularly preferred. These titanium compounds E may be used alone or in combination of two or more. The titanium compound E may be added at any time of initiating the production of ester D, during its production and after its production (at the time of initiating the oligomerization step) as long as added before the oligomerization step is initiated. To prevent the deactivation due to water, the orthotitanic acid ester is preferably added after completing the production of ester D.

The oligomerization step is conducted in the presence of the titanium compound E in an amount such that the number of titanium atoms is preferably 0.0001 to 5%, more preferably 0.0005 to 0.5%, and still more preferably 0.001 to 0.1 of the number of dicarboxylic acid constitutional units in the diol D used. Within the above range, the transesterification between the ester D and the diol A having a cyclic acetal skeleton is allowed to proceed promptly. As a result, the oligomerization step is made shorter to avoid side reactions such as the decomposition of diol A and the discoloration of polyester resins during the oligomerization. In addition, since the diol A is quantitatively introduced into the oligomer chain even when the diol A is sublimable, the processing problem such as the clogging of vacuum lines due to the sublimation of unreacted diol A during the polycondensation and the problem on product quality such as failure in introducing a desired amount of diol A constitutional units into the oligomer chain are avoided.

The temperature of the oligomerization step is preferably 80 to 240° C., more preferably 100 to 235° C. and still more preferably 150 to 230° C. When conducting under the above temperature condition, undesirable side reactions such as decomposition of the cyclic acetal skeleton of diol A and formation of three- and four-functional substances are effectively prevented. The pressure of the oligomerization step is preferably 10 to 500 kPa and more preferably 10 to 100 kPa. When conducing under the above pressure condition, the diol C being released by the transesterification between the ester D and the diol A is rapidly distilled out of the reaction system to promote the transesterification between the ester D and the diol A, this permitting the prevention of undesirable side reactions such as etherification of the diol C by dehydration and promoting the rapid removal of the water being released by the etherification by dehydration.

In the oligomerization step, the diol C is removed by distillation out of the reaction system until the total number of diol A constitutional units and diol C constitutional units reaches preferably 1.05 to 2.0 times, more preferably 1.05 to 1.5 times and still more preferably 1.05 to 1.2 times the number of dicarboxylic acid constitutional units in the oligomer, because the transesterification between the ester D and the diol A is promoted and undesirable side reactions such as etherification of diol C by dehydration are prevented.

The oligomerization step is continued until the degree of transesterification between the ester D and the diol A reaches preferably 50 mol % or higher, more preferably 70 mol % or higher and still more preferably 90 mol % or higher. The termination of the oligomerization step is preferably determined according to the amount of the diol C distilled off because of its easiness. The oligomerization step is preferably completed within 5 h, more preferably within 3 h and still more preferably within 2 h, because undesirable side reactions such as decomposition of the cyclic acetal skeleton of diol A and formation of three- and four-functional substances are prevented.

The oligomerization step may be performed in the presence of a phosphorus compound F. The phosphorus compound F is used in an amount such that the number of phosphorus atoms is preferably 0.0001 to 5%, more preferably 0.001 to 0.5%, and still more preferably 0.005 to 0.1% of the number of dicarboxylic acid constitutional units in the ester D used. Within the above range, the discoloration of polyester resins attributable to the use of the titanium compound E is prevented.

Examples of the phosphorus compound F include, but not limited to, phosphoric acid; phosphorous acid; phosphoric esters such as methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate and triphenyl phosphate; and phosphorous esters such as methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite and triphenyl phosphite, with phosphoric esters being preferred and trimethyl phosphate being particularly preferred. These phosphorus compounds may be used alone or in combination of two or more. It is sufficient for the purpose that phosphorus atom is present in the reaction system in the amount range mentioned above at the initiation of the oligomerization step. If a phosphorus compound is used as the heat stabilizer in the production of the ester D and phosphorus atom is present in the amount range mentioned above at the initiation of the oligomerization step, the addition of fresh phosphorus compound F may be omitted.

If the oligomerization step is performed in the presence of the phosphorus compound F in addition to the titanium compound E, the ratio of the number of titanium atoms and the number of phosphorus atoms, Ti/P, is preferably 0.02 to 2, more preferably 0.035 to 1.0, and still more preferably 0.05 to 0.5.

The oligomerization may be performed in the presence of the phosphorus compound F and a germanium compound G in addition to the titanium compound E. The phosphorus component F is used in an amount such that the number of phosphorus atoms is preferably 0.0001 to 5%, more preferably 0.001 to 0.5%, and still more preferably 0.005 to 0.1% of the number of dicarboxylic acid constitutional units in the ester D used. The germanium compound G is used in an amount such that the number of germanium atoms is preferably 0.0001 to 5%, more preferably 0.001 to 0.5%, and still more preferably 0.01 to 0.1% of the number of dicarboxylic acid constitutional units in the ester D used. By the coexistence of phosphorus atom and germanium atom within the above ranges, the discoloration of polyester resins is effectively prevented even when the discoloration is not prevented by the sole use of the phosphorus compound F because of the use of the titanium compound E in an amount exceeding the preventing ability of the phosphorus compound F.

The phosphorus compound F is selected from those described above. Examples of the germanium compounds G include, but not limited to, oxides of germanium such as amorphous germanium dioxide and crystalline germanium dioxide; germanium alkoxides such as germanium tetraethoxide, germanium tetraisopropoxide and germanium tetra-n-butoxide; germanium carboxylates such as germanium acetate; germanium halides such as germanium chloride; and germanium hydroxide, with the germanium dioxides being preferred. These germanium compounds G may be used alone or in combination of two or more. It is preferred to add the germanium oxide in the form of aqueous solution or a solution in the diol C having no cyclic acetal skeleton.

It is sufficient for the purpose that phosphorus atom is present in the reaction system in the amount range mentioned above at the initiation of the oligomerization step. If a phosphorus compound is used as the heat stabilizer in the production of the ester D and phosphorus atom is present in the amount range mentioned above at the initiation of the oligomerization step, the addition of fresh phosphorus compound F may be omitted. Similarly, if a germanium compound is used as the catalyst for the production of the ester D and germanium atom is present in the amount range mentioned above at the initiation of the oligomerization step, the addition of fresh germanium compound G may be also omitted.

An aqueous solution of germanium dioxide is added to the reaction system particularly preferably at the time of initiating the production of the ester D, because the water content of the reaction mixture in the oligomerization step exceeds 0.5% by weight if added after the production of the ester D thereby to decompose the cyclic acetal skeleton of diol A to form three- and four-functional substances.

If the oligomerization step is performed in the presence of both the phosphorus compound F and the germanium compound G in addition to the titanium compound E, the ratio of the number of titanium atoms and the number of phosphorus atoms, Ti/P, is preferably 0.02 to 2, more preferably 0.035 to 1.0, and still more preferably 0.05 to 0.5, and the ratio of the number of titanium atoms and the number of germanium atoms, Ti/Ge, is preferably 0.05 to 1, more preferably 0.1 to 0.75, and still more preferably 0.2 to 0.5.

The oligomerization may be performed in the presence of a basic compound H in an amount such that the number of molecules of basic compound H is preferably 0.0001 to 5%, more preferably 0.001 to 0.5% and still more preferably 0.005 to 0.1% of the number of dicarboxylic acid constitutional units in the ester D used. Within the above range, the resultant polyester resins will acquire a high heat stability to allow the production of molded articles excellent in appearance and mechanical properties without causing a significant reduction of molecular weight. The basic compound H is added most preferably at the initiation of the oligomerization step.

Examples of the basic compound E include, but not particularly limited to, carbonates, hydroxides, carboxylates, oxides, chlorides and alkoxides of alkali metals such as lithium, sodium and potassium; carbonates, hydroxides, carboxylates, oxides, chlorides and alkoxides of alkaline earth metals such as beryllium, magnesium and calcium; and amines such as trimethylamine and triethylamine, with the carbonates, hydroxides and carboxylates of alkali metals and the carbonates, hydroxides and carboxylates of alkaline earth metals being preferred, and the carboxylates of alkali metals being more preferred. The use of the carboxylates of alkali metals particularly improves the resistance to thermal decomposition and makes the transparency of polyester resins excellent. Examples of the carboxylates of alkali metals include formates, acetates, propionates, butyrates, isobutyrates, valerates, caproates, caprylates, caprinates, laurates, myristate, palmitates, stearates and benzoates of alkali metals, with the formates, acetates, propionates, butyrates, isobutyrates and benzoates of alkali metals being preferred, and potassium acetate, sodium acetate, lithium acetate, potassium propionate, sodium propionate and lithium propionate being more preferred. These basic compounds may be used singly or in combination of two or more.

When the water content in the reaction mixture is 0.5% by weight or less during the oligomerization step, the decomposition of diol A due to water is prevented. The water content is preferably 0.3% by weight or less and more preferably 0.1% by weight or less.

In the polymerization step of the invention, the oligomer produced in the oligomerization step is polycondensed under reduced pressure to increase the molecular weight. The polymerization step may be performed in the same manner as in the polycondensation employed in the conventional methods for producing polyester resins. Specifically, the reaction pressure is gradually reduced and finally reduced to about 0.1 to 300 Pa. If the final reaction pressure exceeds 300 Pa, a sufficiently high reaction rate of the polycondensation may be unfavorably not obtained. The temperature is gradually raised and the polycondensation reaction is preferably conducted at 190 to 300° C. If the polycondensation temperature exceeds 300° C., undesired side reactions such as heat decomposition of reactants tend to occur and the resultant polyester resins tend to be significantly yellowed. The completion of the polymerization may be determined in the same manner as in the common methods for producing polyester resins, i.e., determined by whether the desired polymerization degree measured by melt viscosity is achieved. The melt viscosity is preferably determined by the load on an agitator which was read as the torque or the load current of a motor because of easiness. The reaction time in the polymerization step is 6 h or less and preferably 4 h or less, because undesirable side reactions such as decomposition of the cyclic acetal skeleton of diol A and formation of three- and four-functional substances are prevented, and the yellowness of resultant polyester resins becomes low.

Since the titanium compound E serves also as the polycondensation catalyst, there is no need to add another catalyst in the polymerization step. However, a known polycondensation catalyst may be added as a co-catalyst in an amount such that the number of metal atoms of the co-catalyst is 0.0001 to 5% of the number of dicarboxylic acid constitutional units.

In the production method of the invention, known etherification inhibitors such as amines, stabilizers such as heat stabilizers, polymerization modifiers, etc. may be used. Also usable are light stabilizers, antistatic agents, lubricants, antioxidants, mold release agents, etc.

The polyester resins produced by the process of the invention have a molecular weight distribution (Mw/Mn) of preferably 2.5 to 12.0, more preferably 2.5 to 7.0 and still more preferably 2.5 to 5.0. With the molecular weight distribution within the above range, the polyester resins exhibit a good moldability.

The polyester resins produced by the process of the invention may be molded by known molding methods such as, but not limited to, injection molding, extrusion, calendering, extrusion foaming, extrusion blow molding and injection blow molding.

The present invention will be described in more detail by reference to the following examples. However, it should be noted that the following examples are only illustrative and not intended to limit the invention thereto. The evaluation methods used herein are as follows.

(I) Evaluation of Ester D (i) Acid Value

Into 50 ml of an o-cresol/chloroform/1,1,2,2-tetrachloroethane (70/15/15 by mass) mixed solvent, accurately weighed 1 g of ester D was dissolved. The solution was subjected to potentiometric titration with a 0.1 N potassium hydroxide in ethanol using an automatic titrator "COM-2000" available from Hiranuma Sangyo Co., Ltd.

(ii) Average Polymerization Degree

Into 20 g of a chloroform/1,1,1,3,3,3-hexafluoro-2-propanol (99/1 by mass) mixed solvent, 2 mg of ester D was dissolved. The solution was subjected to gel permeation chromatography (GPC) and the results were calibrated by a standard polystyrene. The GPC was conducted using a GPC apparatus "TOSOH 8020" equipped with two "TSK GMHHR-L" columns and one "TSK G5000HR" column all available from Tosoh Corporation at a column temperature of 40° C. A chloroform eluent was flowed through the columns at a rate of 1.0 mL/min and the detection was made by UV detector.

(II) Evaluation of Reaction Mixture at Initiation of Oligomerization Step (i) Water Content The water contained in accurately weighed 0.1 g of a reaction mixture of the ester D and the diol A was vaporized by a water vaporizer at 235° C. under a nitrogen flow, and its amount was measured by a trace water analyzer "CA-05 Model" available from Mitsubishi Chemical Corp., under a nitrogen flow at a rate of 200 mL/min for 30 min.

(III) Influence of Sublimation (i) Ultimate Pressure in Polymerization Step

The ultimate pressure attained in the polymerization step after evacuation was evaluated according to the following ratings.

A: ultimate pressure reached 100 Pa or below, and kept constant or reduced gradually.

B: ultimate pressure reached was higher than 100 Pa and 300 Pa or below.

C: ultimate pressure failed to reach 300 Pa or below.

(ii) Adhesion of Sublimates

After the polymerization step, the inside of vacuum lines of apparatus was visually observed to evaluate the adhesion of sublimates according to the following ratings.

A: substantially no adhesion of sublimates.

B: noticeable adhesion of sublimates.

C: clogging of vacuum lines due to adhesion of sublimates.

(IV) Evaluation of Polyester Resin (i) Number-Average Molecular Weight and Molecular Weight Distribution (Mw/Mn)

A solution of 2 mg of polyester resin in 20 g of chloroform was subjected to gel permeation chromatography (GPC) and the results were calibrated by a standard polystyrene to obtain the number-average molecular weight Mn and the molecular weight distribution Mw/Mn. The GPC was conducted using a GPC apparatus "TOSOH 8020" equipped with two "TSK GMHHR-L" columns and one "TSK G5000HR" column all available from Tosoh Corporation at a column temperature of 40° C. A chloroform eluent was flowed through the columns at a rate of 1.0 mL/min and the detection was made by UV detector.

(ii) Copolymerization Proportion (mol %) of Diol A

A solution of 20 mg of polyester resin in 1 g of heavy chloroform was subjected to $^1$H-NMR analysis and the copolymerization proportion of diol A was calculated from the peak area ratio. The $^1$H-NMR analysis was conducted at 400 MHz using "NM-AL400" available from Nippon Denshi Co., Ltd.

(iii) Degree of Introduction of Diol A

Calculated from the following formula:

Degree of Introduction of Diol $A(\%)=(X/Y)\times100$ wherein X is the copolymerization proportion of diol A calculated as described above, and Y is a theoretical copolymerization proportion of diol A calculated from the amount of initial charge.

(iv) Yellowness

A disc sample with a 3.2 mm thickness and a 100 mm diameter was prepared by molding polyester resin at 240 to 280° C. cylinder temperature and 35° C. mold temperature using a screw injection molding machine having a screw diameter of 32 mm and a clamping pressure of 9.8 kN. The disc sample was measured for yellowness by a transmission method according to JIS K7103 in an atmosphere of 23° C. and 50% relative humidity using a color difference meter "Z-II" available from Nippon Denshoku Industries Co., Ltd.

(5) Impact Resistance

From a given height, a 19.4 kg weight having a hemisphere tip of 20 mm diameter was allowed to gravitationally drop onto a sample with 3.2 mm thick prepared by molding in the same manner as described above. Repeating the drop-weight test, the largest dropping height at which the sample was not broken was determined and the impact resistance was expressed by the energy given by the weight. The apparatus used was a drop-weight impact tester available from Parker Corporation.

EXAMPLES 1–12

The dicarboxylic acid B, the diol C having no cyclic acetal skeleton, the phosphorus compound F and the germanium compound G as shown in Tables 1 to 3 were charged into a reactor and subjected to esterification by a common method. The ester was mixed with the diol C and manganese acetate for depolymerization as shown in Table 1–3, and then depolymerized at 215° C. under atmospheric pressure. The depolymerization was continued for 3 h while distilling off the released water, and then the diol C was distilled off at 215° C. under 13.3 kPa to obtain esters D2-1 to D2-12 (production method 2).

The average polymerization degrees and acid values of the obtained esters are shown in Table 1. The germanium compound G was added in the form of 1 wt % aqueous solution.

Each of the obtained esters D2-1 to D2-12 was mixed with given amounts of the titanium compound E, the diol A having a cyclic acetal skeleton and the basic compound H as shown in Tables 1–3 and the transesterification was conducted at 225° C. under 13.3 kPa for 3 h to obtain an oligomer. During the reaction, the diol C was distilled off out of the reaction system. The molar ratio, (diol A constitutional units+diol C constitutional units)/dicarboxylic acid constitutional units (expressed as "diol units/acid units" in tables) of the oligomer reached the value shown in Tables 1–3 (oligomerization step).

The obtained oligomer was polycondensed while increasing the temperature and reducing the pressure, and finally at 270° C. under a high vacuum of 300 Pa or lower. The polycondensation was terminated when the melt viscosity reached a predetermined level to obtain a polyester resin (polymerization step).

The evaluation results of the polyester resins are shown in Tables 1–3.

Abbreviations in Tables

PTA: terephthalic acid

PET: poly(ethylene terephthalate)

BHET: bis(β-hydroxyethyl) terephthalate

EG: ethylene glycol

SPG: 3,9-bis(1,1-dimethyl-2-hydroxyethyl)-2,4,8,10-tetraoxaspiro[5.5]undecane

DOG: 5-methylol-5-ethyl-2-(1,1-dimethyl-2-hydroxyethyl)-1,3-dioxane

TBT: tetra-n-butyl titanate

TMP: trimethyl phosphate

GeO$_2$: germanium dioxide

Sb$_2$O$_3$: antimony trioxide ratio of Ti (%): ratio of the number of titanium atoms to the number of dicarboxylic acid constitutional units in the ester D used.

ratio of P(%): ratio of the number of phosphorus atoms to the number of dicarboxylic acid constitutional units in the ester D used.

ratio of Ge (%): ratio of the number of germanium atoms to the number of dicarboxylic acid constitutional units in the ester D used.

TABLE 1

|  | Examples | | | |
| --- | --- | --- | --- | --- |
|  | 1 | 2 | 3 | 4 |
| Esterification | | | | |
| Dicarboxylic acid B | | | | |
| PTA (mol) | 26.0 | 26.0 | 26.0 | 26.0 |
| Diol C | | | | |
| EG (mol) | 31.2 | 31.2 | 31.2 | 31.2 |
| Phosphorus compound F | | | | |
| TMP (mol) | — | — | — | — |
| ratio of P (%) | — | — | — | — |
| Germanium compound G | | | | |
| $GeO_2$ (mol) | — | — | — | — |
| ratio of Ge (%) | — | — | — | — |
| Depolymerization | | | | |
| EG (mol) | 26.0 | 33.8 | 20.8 | 46.8 |
| manganese acetate (mol) | — | — | — | 0.0078 |
| Ester D | D2-1 | D2-2 | D2-3 | D2-4 |
| average polymerization degree | 10 | 6 | 4 | 3 |
| acid value (μeq/g) | 5 | 6 | 8 | 9 |
| Oligomerization | | | | |
| Titanium compound E | | | | |
| TBT (mol) | 0.0013 | 0.0026 | 0.0013 | 0.0026 |
| ratio of Ti (%) | 0.005 | 0.010 | 0.005 | 0.010 |
| Ti/P (mol/mol) | — | — | — | — |
| Ti/Ge (mol/mol) | — | — | — | — |
| Basic compound H | | | | |
| potassium acetate (mol) | — | 0.0052 | — | — |
| Diol A | | | | |
| SPG (mol) | 1.3 | 14.3 | 6.5 | — |
| DOG (mol) | — | — | — | 2.6 |
| diol units/acid units | 1.20 | 1.40 | 1.30 | 1.25 |
| water content (%) | 0.02 | 0.02 | 0.02 | 0.02 |
| Evaluation of sublimation | | | | |
| ultimate pressure | A | A | A | A |
| adhesion of sublimate | A | A | A | A |
| Evaluation of polyester | | | | |
| Mn | 17500 | 15500 | 17000 | 18000 |
| Mw/Mn | 3.9 | 4.6 | 4.1 | 4.0 |
| copolymerization proportion (mol %) | 5.0 | 54.9 | 25.0 | 10.0 |
| degree of introduction (%) | 100.0 | 99.8 | 99.9 | 100.0 |
| yellowness | 31.5 | 60.1 | 43.3 | 33.1 |
| impact resistance (kJ/m) | 38 | 38 | 38 | 38 |

TABLE 2

|  | Examples | | | |
| --- | --- | --- | --- | --- |
|  | 5 | 6 | 7 | 8 |
| Esterification | | | | |
| Dicarboxylic acid B | | | | |
| PTA (mol) | 26.0 | 26.0 | 26.0 | 26.0 |
| Diol C | | | | |
| EG (mol) | 31.2 | 31.2 | 31.2 | 31.2 |
| Phosphorus compound F | | | | |
| TMP (mol) | 0.0104 | 0.0052 | 0.0208 | 0.0026 |
| ratio of P (%) | 0.040 | 0.020 | 0.080 | 0.010 |
| Germanium compound G | | | | |
| $GeO_2$ (mol) | — | — | — | — |
| ratio of Ge (%) | — | — | — | — |

TABLE 2-continued

| | Examples | | | |
|---|---|---|---|---|
| | 5 | 6 | 7 | 8 |
| Depolymerization | | | | |
| EG (mol) | 26.0 | 33.8 | 20.8 | 46.8 |
| manganese acetate (mol) | — | — | — | 0.0078 |
| Ester D | D2-5 | D2-6 | D2-7 | D2-8 |
| average polymerization degree | 10 | 6 | 4 | 3 |
| acid value (µeq/g) | 5 | 6 | 8 | 9 |
| Oligomerization | | | | |
| Titanium compound E | | | | |
| TBT (mol) | 0.0013 | 0.0026 | 0.0013 | 0.0026 |
| ratio of Ti (%) | 0.005 | 0.010 | 0.005 | 0.010 |
| Ti/P (mol/mol) | 0.125 | 0.500 | 0.0625 | 1.000 |
| Ti/Ge (mol/mol) | — | — | — | — |
| Basic compound H | | | | |
| potassium acetate (mol) | — | 0.0052 | — | — |
| Diol A | | | | |
| SPG (mol) | 1.3 | 14.3 | 6.5 | — |
| DOG (mol) | — | — | — | 2.6 |
| diol units/acid units | 1.20 | 1.40 | 1.30 | 1.25 |
| water content (%) | 0.02 | 0.02 | 0.02 | 0.02 |
| Evaluation of sublimation | | | | |
| ultimate pressure | A | A | A | A |
| adhesion of sublimate | A | A | A | A |
| Evaluation of polyester | | | | |
| Mn | 17500 | 16000 | 17000 | 17000 |
| Mw/Mn | 3.6 | 4.1 | 3.8 | 3.7 |
| copolymerization proportion (mol %) | 5.0 | 54.9 | 25.0 | 10.0 |
| degree of introduction (%) | 100.0 | 99.8 | 99.9 | 100.0 |
| yellowness | 8.9 | 12.3 | 9.9 | 10.5 |
| impact resistance (kJ/m) | 76 | 38 | 114 | 76 |

TABLE 3

| | Examples | | | |
|---|---|---|---|---|
| | 9 | 10 | 11 | 12 |
| Esterification | | | | |
| Dicarboxylic acid B | | | | |
| PTA (mol) | 26.0 | 26.0 | 26.0 | 26.0 |
| Diol C | | | | |
| EG (mol) | 31.2 | 31.2 | 31.2 | 31.2 |
| Phosphorus compound F | | | | |
| TMP (mol) | 0.0104 | 0.0052 | 0.0208 | 0.0020 |
| ratio of P (%) | 0.040 | 0.020 | 0.080 | 0.020 |
| Germanium compound G | | | | |
| GeO$_2$ (mol) | 0.0104 | 0.0021 | 0.0026 | 0.0052 |
| ratio of Ge (%) | 0.040 | 0.008 | 0.010 | 0.020 |
| Depolymerization | | | | |
| EG (mol) | 26.0 | 33.8 | 20.8 | 46.8 |
| manganese acetate (mol) | — | — | — | 0.0078 |
| Ester D | D2-9 | D2-10 | D2-11 | D2-12 |
| average polymerization degree | 10 | 6 | 4 | 3 |
| acid value (µeq/g) | 5 | 6 | 8 | 9 |

TABLE 3-continued

| | Examples | | | |
|---|---|---|---|---|
| | 9 | 10 | 11 | 12 |
| Oligomerization | | | | |
| Titanium compound E | | | | |
| TBT (mol) | 0.0013 | 0.0026 | 0.0013 | 0.0026 |
| ratio of Ti (%) | 0.005 | 0.010 | 0.005 | 0.010 |
| Ti/P (mol/mol) | 0.125 | 0.500 | 0.0625 | 1.300 |
| Ti/Ge (mol/mol) | 0.125 | 0.800 | 0.500 | 0.500 |
| Basic compound H | | | | |
| potassium acetate (mol) | — | 0.0052 | — | — |
| Diol A | | | | |
| SPG (mol) | 1.3 | 14.3 | 6.5 | — |
| DOG (mol) | — | — | — | 2.6 |
| diol units/acid units | 1.20 | 1.40 | 1.30 | 1.25 |
| water content (%) | 0.02 | 0.02 | 0.02 | 0.02 |
| Evaluation of sublimation | | | | |
| ultimate pressure | A | A | A | A |
| adhesion of sublimate | A | A | A | A |
| Evaluation of polyester | | | | |
| Mn | 17000 | 16500 | 18000 | 18000 |
| Mw/Mn | 3.5 | 3.6 | 3.7 | 3.7 |
| copolymerization proportion (mol %) | 5.0 | 55.0 | 25.0 | 10.0 |
| degree of introduction (%) | 100.0 | 99.9 | 99.9 | 100.0 |
| yellowness | 3.3 | 4.1 | 5.4 | 6.1 |
| impact resistance (kJ/m) | 133 | 76 | 133 | 133 |

EXAMPLES 13–16

The dicarboxylic acid B, the diol C having no cyclic acetal skeleton, the phosphorus compound F and the germanium compound G as shown in Table 4 were charged into a reactor and subjected to esterification by a common method. After completion of the esterification, the polycondensation was conducted by a common method to obtain esters D1-1 to D1-3 (production method 1).

The average polymerization degrees and acid values of the obtained esters are shown in Table 4. The germanium compound G was added in the form of 1 wt % aqueous solution.

Each of the obtained esters D1-1 to D1-3 was mixed with given amounts of the titanium compound E, the diol A having a cyclic acetal skeleton and the basic compound H as shown in Table 4 and the transesterification was conducted at 225° C. under 13.3 kPa for 3 h to obtain an oligomer. During the reaction, the diol C was distilled off out of the reaction system. The molar ratio, (diol A constitutional units+diol C constitutional units)/dicarboxylic acid constitutional units (expressed as "diol units/acid units" in tables) of the oligomer reached the value shown in Table 4 (oligomerization step).

The obtained oligomer was polycondensed while increasing the temperature and reducing the pressure, and finally at 270° C. under a high vacuum of 300 Pa or lower. The polycondensation was terminated when the melt viscosity reached a predetermined level to obtain a polyester resin (polymerization step).

The evaluation results of the polyester resins are shown in Table 4.

TABLE 4

| | Examples | | | |
|---|---|---|---|---|
| | 13 | 14 | 15 | 16 |
| Esterification | | | | |
| Dicarboxylic acid B | | | | |
| PTA (mol) | 26.0 | 26.0 | 26.0 | 26.0 |
| Diol C | | | | |
| EG (mol) | 39.0 | 39.0 | 39.0 | 39.0 |
| Phosphorus compound F | | | | |
| TMP (mol) | — | 0.0052 | 0.0052 | 0.0052 |
| ratio of P (%) | — | 0.020 | 0.020 | 0.020 |
| Germanium compound G | | | | |
| GeO$_2$ (mol) | — | — | 0.0052 | 0.0052 |
| ratio of Ge (%) | — | — | 0.020 | 0.020 |
| Ester D1 | D1-1 | D1-2 | D1-3 | D1-3 |
| average polymerization degree | 55 | 55 | 55 | 55 |
| acid value (μeq/g) | 18 | 18 | 18 | 18 |
| Oligomerization | | | | |
| Titanium compound E | | | | |
| TBT (mol) | 0.0013 | 0.0013 | 0.0013 | 0.0013 |
| ratio of Ti (%) | 0.005 | 0.005 | 0.005 | 0.005 |
| Ti/P (mol/mol) | — | 0.250 | 0.250 | 0.250 |
| Ti/Ge (mol/mol) | — | — | 0.250 | 0.250 |

TABLE 4-continued

|  | Examples | | | |
| --- | --- | --- | --- | --- |
|  | 13 | 14 | 15 | 16 |
| Basic compound H | | | | |
| potassium acetate (mol) | — | 0.0052 | — | — |
| Diol A | | | | |
| SPG (mol) | 6.5 | 6.5 | 6.5 | — |
| DOG (mol) | — | — | — | 2.6 |
| diol units/acid units | 1.25 | 1.25 | 1.25 | 1.10 |
| water content (%) | 0.02 | 0.02 | 0.02 | 0.02 |
| Evaluation of sublimation | | | | |
| ultimate pressure | A | A | A | A |
| adhesion of sublimate | A | A | A | A |
| Evaluation of polyester | | | | |
| Mn | 15000 | 16000 | 17000 | 17000 |
| Mw/Mn | 4.0 | 3.9 | 3.8 | 3.8 |
| copolymerization proportion (mol %) | 25.0 | 25.0 | 25.0 | 10.0 |
| degree of introduction (%) | 99.9 | 100.0 | 99.8 | 100.0 |
| yellowness | 47.0 | 10.2 | 4.0 | 3.7 |
| impact resistance (kJ/m) | 38 | 57 | 76 | 76 |

EXAMPLES 17–19

The ester D (bis(β-hydroxyethyl) terephthalate (BHET) available from Kanto Chemical Co., Ltd.) was added with the diol A, the titanium compound E, the phosphorus compound F and the germanium compound G in amounts described in Table 5, and further added with potassium acetated in an amount of 0.02 mol % of the dicarboxylic acid constitutional units of the ester D. The mixture was allowed to react at 225° C. under 13.3 kPa for 3 h (oligomerization step). The germanium compound G was added in the form of 0.5 wt % ethylene glycol solution.

The obtained oligomer was polycondensed while increasing the temperature and reducing the pressure, and finally at 270° C. under a high vacuum of 300 Pa or lower. The polycondensation was terminated when the melt viscosity reached a predetermined level to obtain a polyester resin (polymerization step).

The evaluation results of the polyester resins are shown in Table 5.

TABLE 5

|  | Examples | | |
| --- | --- | --- | --- |
|  | 17 | 18 | 19 |
| Oligomerization Ester D | | | |
| BHET (mol) | 26.0 | 26.0 | 26.0 |

TABLE 5-continued

|  | Examples | | |
| --- | --- | --- | --- |
|  | 17 | 18 | 19 |
| Titanium compound E | | | |
| TBT (mol) | 0.0013 | 0.0013 | 0.0013 |
| ratio of Ti (%) | 0.005 | 0.005 | 0.005 |
| Ti/P (mol/mol) | — | 0.250 | 0.250 |
| Ti/Ge (mol/mol) | — | — | 0.250 |
| Phosphorus compound F | | | |
| TMP (mol) | — | 0.0052 | 0.0052 |
| ratio of P (%) | — | 0.020 | 0.020 |
| Germanium compound G | | | |
| $GeO_2$ (mol) | — | — | 0.0052 |
| ratio of Ge (%) | — | — | 0.020 |
| Diol A | | | |
| SPG (mol) | 6.5 | 6.5 | 6.5 |
| diol units/acid units | 1.50 | 1.50 | 1.50 |
| water content (%) | 0.02 | 0.02 | 0.02 |
| Evaluation of sublimation | | | |
| ultimate pressure | A | A | A |
| adhesion of sublimate | A | A | A |
| Evaluation of polyester | | | |
| Mn | 16000 | 16500 | 17000 |
| Mw/Mn | 4.0 | 3.9 | 3.8 |
| copolymerization proportion (mol %) | 25.0 | 25.0 | 25.0 |
| degree of introduction (%) | 99.9 | 100.0 | 99.9 |
| yellowness | 44.1 | 9.5 | 4.5 |
| impact resistance (kJ/m) | 38 | 57 | 76 |

COMPARATIVE EXAMPLES 1–4

In the same manner as in Examples 1–3 except for using antimony trioxide or germanium dioxide in the oligomerization step in place of the titanium compound E, each polyester as shown in Table 6 was obtained. The amount of antimony trioxide or germanium dioxide was 0.03 mol % of the dicarboxylic acid constitutional units of the ester D used. Antimony trioxide was added in the form of 2 wt % ethylene glycol solution and germanium dioxide was in the form of 0.5 wt % ethylene glycol solution.

The degree of introduction of the diol A having a cyclic acetal skeleton was extremely low because the use of the titanium compound E was omitted. In addition, the production was not performed stably because the ultimate pressure was high and the clogging of pipes occurred by the sublimation of the diol C. In Comparative Example 2, the process was discontinued because of the clogging of pipes, thereby failing to produce injection-moldable polyester resin.

TABLE 6

|  | Comparative Examples | | | |
| --- | --- | --- | --- | --- |
|  | 1 | 2 | 3 | 4 |
| Oligomerization | | | | |
| Ester D | D2-1 | D2-2 | D2-3 | D2-3 |
| $Sb_2O_3$ (mol) | 0.0078 | 0.0078 | 0.0078 | — |
| $GeO_2$ (mol) | — | — | — | 0.0078 |

TABLE 6-continued

|  | Comparative Examples | | | |
| --- | --- | --- | --- | --- |
|  | 1 | 2 | 3 | 4 |
| Diol A | | | | |
| SPG (mol) | 1.3 | 14.3 | 6.5 | 6.5 |
| diol units/acid units | 1.20 | 1.40 | 1.30 | 1.30 |
| water content (%) | 0.02 | 0.02 | 0.02 | 0.02 |
| Evaluation of sublimation | | | | |
| ultimate pressure | A | C | B | B |
| adhesion of sublimate | B | C | C | C |
| Evaluation of polyester | | | | |
| Mn | 16000 | 10500 | 15500 | 15500 |
| Mw/Mn | 4.1 | 5.7 | 4.3 | 4.2 |
| copolymerization proportion (mol %) | 4.4 | 42.5 | 20.1 | 21.1 |
| degree of introduction (%) | 88.0 | 77.3 | 80.4 | 84.4 |
| yellowness | 6.1 | — | 7.2 | 6.8 |
| impact resistance (kJ/m) | 19 | — | 38 | 38 |

In the process of the present invention, polyester resins including dicarboxylic acid constitutional units and diol constitutional units containing units having a cyclic acetal skeleton, which exhibit high mechanical properties, particularly a high impact resistance and have a low yellowness, are produced stably and industrially advantageously with a less load on the environment as compared to the conventional transesterification methods. Therefore, the present invention has a large industrial value.

What is claimed is:

1. A process for producing a polyester resin comprising dicarboxylic acid constitutional units and diol constitutional units wherein 5 to 60 mol % of the diol constitutional units have a cyclic acetal skeleton, said process comprising:
   an oligomerization step for transesterifying an ester D having an acid value of 30 μeq/g or lower represented by the formula 1:

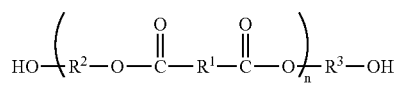

(1)

wherein $R^1$, $R^2$ and $R^3$ are each independently a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and n is an integer of 1 to 200, with a diol A having a cyclic acetal skeleton in the presence of a titanium compound E to produce an oligomer; and
   a polymerization step of polymerizing the oligomer to increase a molecular weight.

2. The process according to claim 1, wherein said ester D is a bishydroxyalkyl dicarboxylate and/or its polymer.

3. The process according to claim 1, wherein said ester D is a bishydroxyalkyl ester of at least one dicarboxylic acid selected from the group consisting of terephthalic acid, isophthalic acid and 2,6-naphthalenedicarboxylic acid, and/or its polymer.

4. The process according to claim 1, wherein said ester D is a polymer of a bishydroxyalkyl dicarboxylate having an average polymerization degree of 15 to 200, which is produced by esterifying a dicarboxylic acid B with a diol C having no cyclic acetal skeleton and then subjecting to polycondensation reaction.

5. The process according to claim 1, wherein said ester D is a polymer of a bishydroxyalkyl dicarboxylate having an average polymerization degree of less than 15 and a melting point of 240° C. or less, said polymer being produced by depolymerizing a low polymer which is prepared by esterifying a dicarboxylic acid B with a diol C having no cyclic acetal skeleton and/or a high polymer which is prepared by polycondensing the low polymer with the diol C having no cyclic acetal skeleton.

6. The process according to claim 1, wherein said ester D is a polymer of a bishydroxyalkyl dicarboxylate having an average polymerization degree of less than 15 and a melting point of 240° C. or lower, said polymer being produced by depolymerizing at least one polyester resin selected from the group consisting of polyethylene terephthalate, polybutylene terephthalate, polyethylene naphthalate, polyethylene terephthalate modified with isophthalic acid, polyethylene terephthalate modified with 1,4-cyclohexanedimethanol, polyethylene terephthalate modified with 3,9-bis(1,1-dimethyl-2-hydroxyethyl)-2,4,8,10-tetraoxaspiro[5.5]undecane and polyethylene terephthalate modified with 5-methylol-5-ethyl-2-(1,1-dimethyl-2-hydroxyethyl)-1,3-dioxane with a diol C having no cyclic acetal skeleton.

7. The process according to claim 1, wherein said ester D is bis(β-hydroxyethyl) terephthalate.

8. The process according to claim 1, wherein said diol A is at least one compound selected from the group consisting of compounds represented by the formula 2:

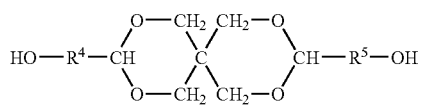

(2)

wherein $R^4$ and $R^5$ are each independently a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and compounds represented by the formula 3:

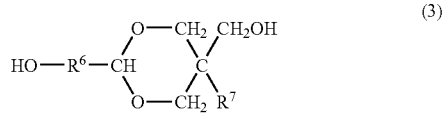

wherein $R^6$ is a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and and $R^7$ is a monovalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups.

9. The process according to claim 1, wherein said diol A is at least one compound selected from the group consisting of 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane.

10. The process according to claim 1, wherein the number of titanium atoms in the oligomerization step is 0.0001 to 5% of the number of the dicarboxylic acid constitutional units in the ester D.

11. The process according to claim 1, wherein the titanium compound E is at least one compound selected from the group consisting of orthotitanic acid esters, titanium carboxylates, alkali metal titanates, titanium halides and titanium oxides.

12. The process according to claim 1, wherein the oligomerization step is performed in the further presence of a phosphorus compound F in an amount such that the number of phosphorus atoms is 0.0001 to 5% of the number of the dicarboxylic acid constitutional units in the ester D.

13. The process according to claim 12, wherein a ratio of the number of titanium atoms of the titanium compound E to the number of phosphorus atoms of the phosphorus compound P is 0.02 to 2.

14. The process according to claim 1, wherein the oligomerization step is performed in the further presence of a phosphorus compound F and a germanium compound G in amounts such that the number of phosphorus atoms is 0.0001 to 5% and the number of germanium atoms is 0.0001 to 5% each based on the number of the dicarboxylic acid constitutional units in the ester D.

15. The process according to claim 14, wherein a ratio of the number of titanium atoms to the number of phosphorus atoms is 0.02 to 2, and a ratio of the number of titanium atoms to the number of germanium atoms is 0.05 to 1.

16. The process according to claim 12, wherein the phosphorus compound F is at least one compound selected from the group consisting of phosphoric acid, phosphorous acid, phosphoric esters and phosphorous esters.

17. The process according to claim 14, wherein the phosphorus compound F is at least one compound selected from the group consisting of phosphoric acid, phosphorous acid, phosphoric esters and phosphorous esters.

18. The process according to claim 14, wherein the germanium compound G is at least one compound selected from the group consisting of germanium oxides, germanium alkoxides, germanium carboxylates, germanium halides and germanium hydroxides.

19. The process according to claim 1, wherein the oligomerization is performed in the further presence of a basic compound H in an amount such that the number of basic compound molecules is 0.0001 to 5% of the number of dicarboxylic acid constitutional units in the ester D.

20. The process according to claim 1, wherein a water content in a reaction mixture of the oligomerization step is 0.5% by weight or lower.

* * * * *